US009079596B2

(12) United States Patent
Sofy et al.

(10) Patent No.: US 9,079,596 B2
(45) Date of Patent: Jul. 14, 2015

(54) CART AND DRAWER ASSEMBLY

(71) Applicant: HMS Mfg. Co., Troy, MI (US)

(72) Inventors: Janet M. Sofy, Troy, MI (US); Robert Todd Solomon, Ray, MI (US); Todd Lajewski, Lapeer, MI (US)

(73) Assignee: HMS MFG. CO., Troy, MI (US)

( * ) Notice: Subject to any disclaimer, the term of this patent is extended or adjusted under 35 U.S.C. 154(b) by 0 days.

(21) Appl. No.: 14/245,575

(22) Filed: Apr. 4, 2014

(65) Prior Publication Data

US 2014/0300260 A1 Oct. 9, 2014

Related U.S. Application Data

(60) Provisional application No. 61/808,434, filed on Apr. 4, 2013.

(51) Int. Cl.
*B62B 3/00* (2006.01)
*A47B 97/00* (2006.01)
(Continued)

(52) U.S. Cl.
CPC ............... *B62B 3/005* (2013.01); *A47B 47/042* (2013.01); *B62B 3/02* (2013.01); *A47B 31/00* (2013.01)

(58) Field of Classification Search
CPC ........ A47B 67/04; A47B 43/00; A47B 43/02; A47B 31/00; A47B 47/042; A47B 88/12; A47B 88/0014; A47B 88/0466; A47B 2210/0062; A47B 2210/0037; A47B 2210/0056; B62B 3/02; B62B 2202/67; B62B 2205/33; B62B 2501/065; B62B 3/005
USPC .......... 91/108, 258, 257.1, 263, 265.1–265.4, 91/351.11, 351.12, 249.8, 249.11, 306, 91/312; 211/187, 190, 191, 192, 126.15; 312/334.44, 334.46, 334.47, 333, 108, 312/258, 257.1, 263, 265.1–265.4, 351.11, 312/351.12, 249.8, 249.11, 306, 312
See application file for complete search history.

(56) References Cited

U.S. PATENT DOCUMENTS 1,659,164 A * 2/1928 Sanders ........................ 312/333
3,028,207 A 4/1962 Darnell
(Continued)

FOREIGN PATENT DOCUMENTS

DE 202011108335 12/2011
EP 1038473 B1 1/2000
(Continued)

Primary Examiner — Daniel J Troy
Assistant Examiner — Andrew Roersma
(74) Attorney, Agent, or Firm — Dickinson Wright PLLC

(57) ABSTRACT

A cart and drawer assembly (20, 120) comprising a pair of panels (22) each having an inner surface (26) disposed in spaced and parallel relationship with one another with said inner surfaces (26) facing each other. Each of the panels (22) defines a pair of beams (32). At least one shelf (66, 166) is disposed between the panels (22) in perpendicular relationship to the panels (22). A plurality of ribs (122) extend from the beams (32) and are spaced from one another along the beams (32). A pair of ears (124, 224) extend from each of the shelves (66, 166) and engage an adjacent pair of the ribs (122) to maintain the panels (22) in spaced and parallel relationship with one another and perpendicular to the shelf (66, 166). Each of the beams (32) define a plurality of sockets (34) spaced from one another. A pair of plugs (76) extend from each of the mounting sides (67, 167) in one of the sockets (34) connecting the shelves (66, 166) to the panels (22). The ears (124, 224) are disposed between said plugs (76).

18 Claims, 14 Drawing Sheets

(51) Int. Cl.
  *A47B 47/00* (2006.01)
  *A47B 91/00* (2006.01)
  *B62B 3/02* (2006.01)
  *A47B 47/04* (2006.01)
  *A47B 31/00* (2006.01)

(56) References Cited

U.S. PATENT DOCUMENTS

| | | |
|---|---|---|
| 3,410,441 A | 11/1968 | Rhyne |
| 3,847,460 A | 11/1974 | Weidt |
| 3,909,078 A * | 9/1975 | Riley ............................ 384/21 |
| 4,073,556 A | 2/1978 | Wilson, Jr. |
| 4,120,551 A | 10/1978 | Godtschalck |
| 4,279,455 A | 7/1981 | Santo |
| 4,925,258 A | 5/1990 | Ludwig et al. |
| 5,069,511 A | 12/1991 | Swets et al. |
| 5,228,761 A | 7/1993 | Huebschen et al. |
| 5,368,380 A | 11/1994 | Mottmiller et al. |
| 5,372,415 A | 12/1994 | Tisbo et al. |
| 5,433,518 A | 7/1995 | Skov |
| 5,447,318 A | 9/1995 | Cantz et al. |
| 5,632,389 A * | 5/1997 | Rosenband .................... 211/187 |
| 5,829,859 A | 11/1998 | Cram |
| 5,839,806 A | 11/1998 | Liu |
| 5,887,878 A | 3/1999 | Tisbo et al. |
| 5,975,660 A | 11/1999 | Tisbo et al. |
| 6,079,719 A | 6/2000 | Tisbo et al. |
| 6,193,340 B1 | 2/2001 | Schenker et al. |
| 6,422,398 B2 | 7/2002 | LaFontaine et al. |
| 6,474,759 B2 | 11/2002 | Hsu |
| 6,764,148 B2 | 7/2004 | Morris et al. |
| 6,892,497 B2 * | 5/2005 | Moon et al. .................... 52/79.1 |
| D506,090 S | 6/2005 | Ben-Or |
| 6,988,780 B2 | 1/2006 | Anderson et al. |
| 7,001,000 B2 | 2/2006 | Irizarry |
| 7,044,569 B1 | 5/2006 | Relyea et al. |
| 7,100,786 B2 | 9/2006 | Smyers |
| D538,997 S | 3/2007 | Schlembach |
| 7,306,298 B2 * | 12/2007 | Doerfler et al. ............... 312/258 |
| 7,387,350 B2 | 6/2008 | Killinger et al. |
| 7,537,295 B2 * | 5/2009 | Jackson ...................... 312/330.1 |
| 7,658,442 B1 | 2/2010 | Whiteside et al. |
| 7,686,173 B2 * | 3/2010 | Robinson et al. ............. 211/190 |
| 7,967,401 B2 | 6/2011 | Hsu |
| 8,147,012 B2 | 4/2012 | Green |
| 2002/0105252 A1 | 8/2002 | Dorman |
| 2002/0185945 A1 | 12/2002 | Hollebone |
| 2004/0089625 A1 | 5/2004 | Tsai |
| 2005/0168115 A1 * | 8/2005 | Moon et al. ................. 312/257.1 |
| 2007/0080614 A1 | 4/2007 | Stein et al. |
| 2007/0145051 A1 | 6/2007 | Uffner et al. |
| 2007/0145870 A1 * | 6/2007 | Uffner et al. ................ 312/257.1 |
| 2009/0273259 A1 | 11/2009 | Whitney et al. |
| 2010/0213804 A1 | 8/2010 | Nowicky et al. |
| 2011/0043088 A1 | 2/2011 | McConnell et al. |
| 2012/0262039 A1 | 10/2012 | Daugbjerg et al. |
| 2012/0326406 A1 | 12/2012 | Lifshitz et al. |

FOREIGN PATENT DOCUMENTS

| | | | |
|---|---|---|---|
| EP | 0 993 793 A1 | 4/2000 | |
| GB | 1557837 | 12/1979 | |
| GB | 2242350 A * | 10/1991 | ............ A47B 88/16 |
| GB | 2421479 B | 6/2006 | |
| JP | 1042979 | 2/1998 | |

* cited by examiner

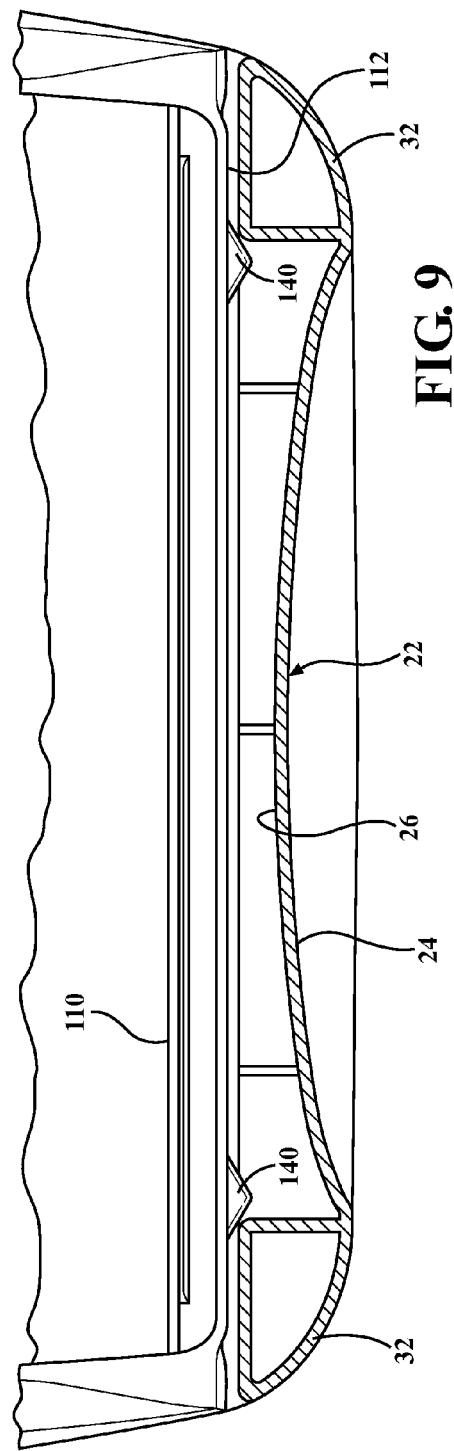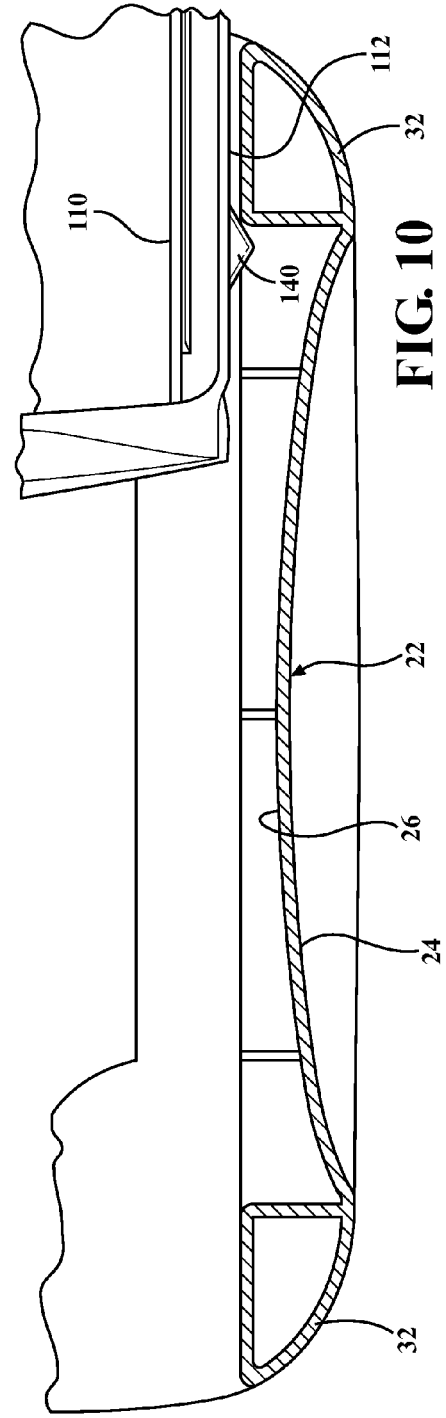

CART AND DRAWER ASSEMBLY

CROSS REFERENCE TO RELATED APPLICATION

This application claims the benefit of application Ser. No. 61/808,434 filed on Apr. 4, 2013.

BACKGROUND OF THE INVENTION

1. Field of the Invention

A cart and drawer assembly.

2. Description of the Prior Art

Cart and drawer assemblies are known in the art and are commonly used in home and office applications for storing articles such as home goods or office supplies. One such cart and drawer assembly is disclosed in US Patent Application Publication Number US 2007/0145051 to Uffner et al. which includes a pair of panels, each having an inner surface, disposed in spaced and parallel relationship with one another with the inner surfaces facing each other. Each of the panels includes a pair of beams that extend in spaced and parallel relationship with one another. A plurality of shelves are disposed between the panels in perpendicular relationship to the panels.

Such cart and drawer assemblies often rely upon an arrangement of sockets defined by the beams and projections extending away from the shelves and disposed in the sockets to secure the shelves to the panels. These cart and drawer assemblies often suffer from certain drawbacks such as swaying of the panels relative to the ground and shelves in response to external forces applied to the panels, as the plug and socket arrangements aren't able to reliably support the panels in perpendicular relationship with the shelves.

SUMMARY OF THE INVENTION

The invention provides for such a cart and drawer assembly and further including a plurality of ribs extending from the beams and spaced from one another along the beams, and at least one ear extending from the shelf and engaging an adjacent pair of the ribs on the beams to maintain the panels in parallel relationship with one another and perpendicular to the shelf.

ADVANTAGES OF THE INVENTION

Thus several advantages of one or more aspects of the invention are that the ears and ribs are able to maintain the panels in parallel relationship with one another and perpendicular to the shelf even when external forces are applied to the panels or shelves.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 is a top cutaway view of the ramps of one of the drawers of the first enabling embodiment being wedged against the beams with the drawer in a closed position;

FIG. 10 is a top cutaway view of one of the ramps of one of the drawers of the first enabling embodiment being wedged against one of the beams with the drawer in an open position;

DETAILED DESCRIPTION OF THE ENABLING EMBODIMENTS

Figure 1:
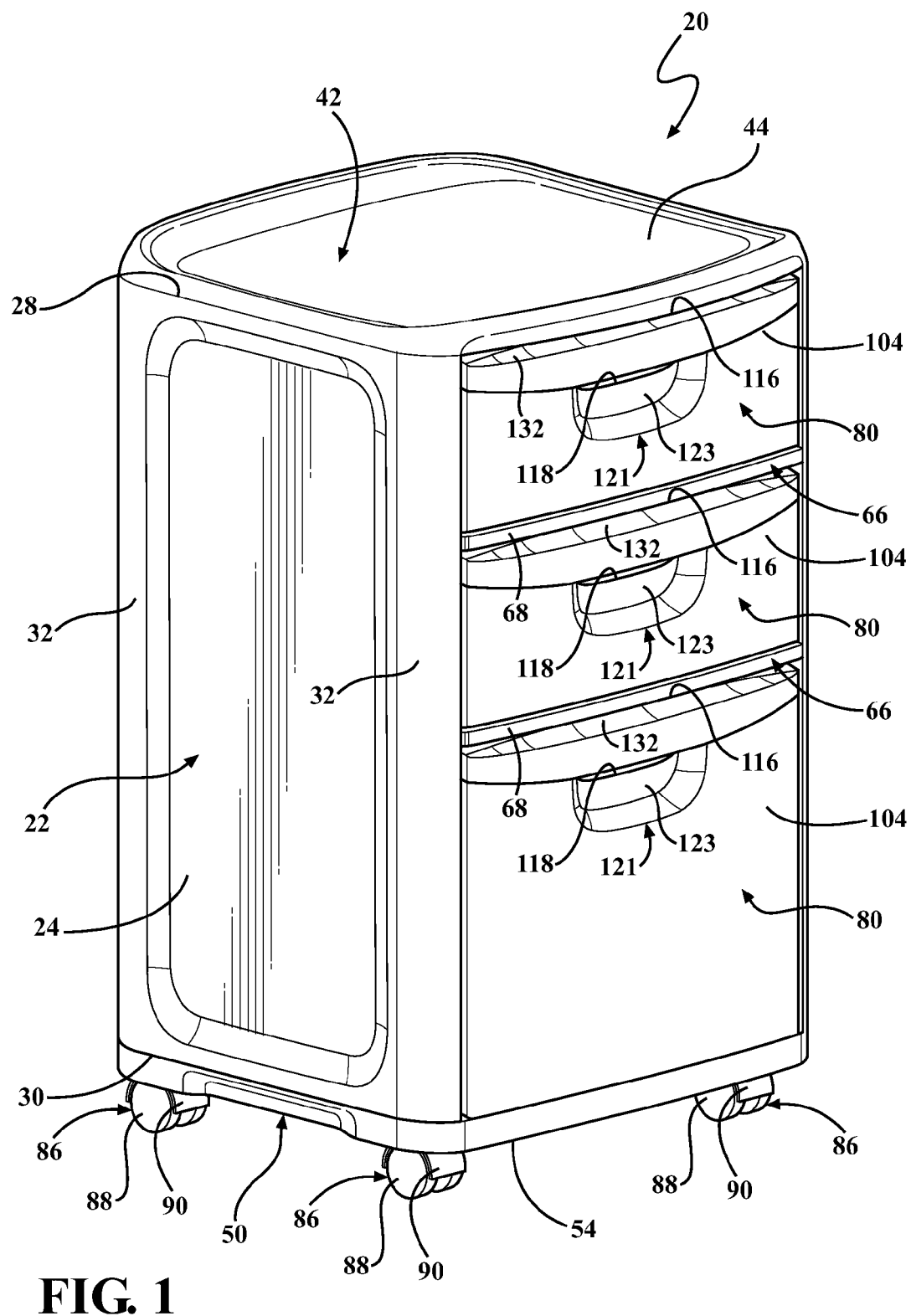
FIG. 1 is a perspective view of the first enabling embodiment.
Figure 2:
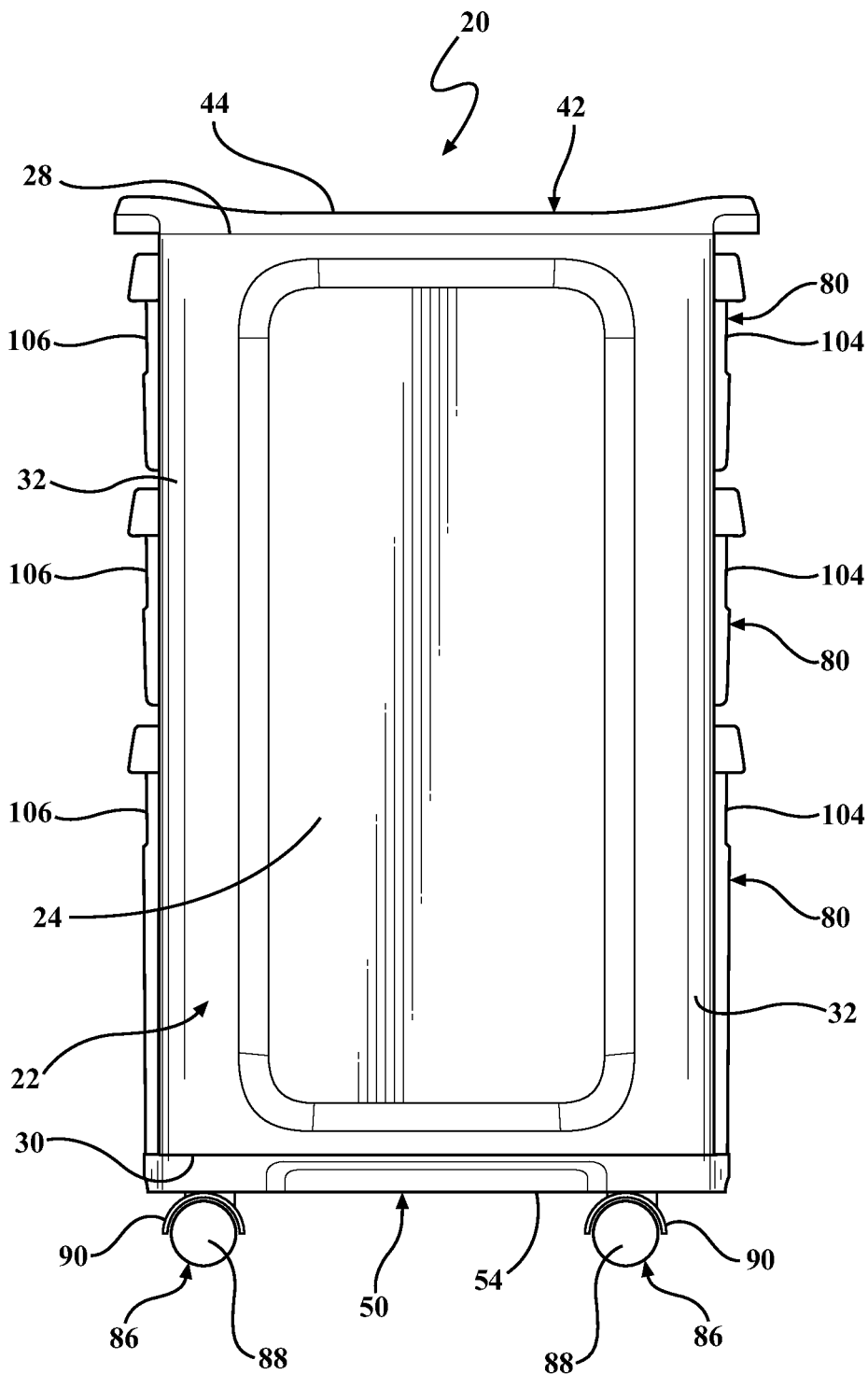
FIG. 2 is a side view of the first enabling embodiment.
Figure 3:
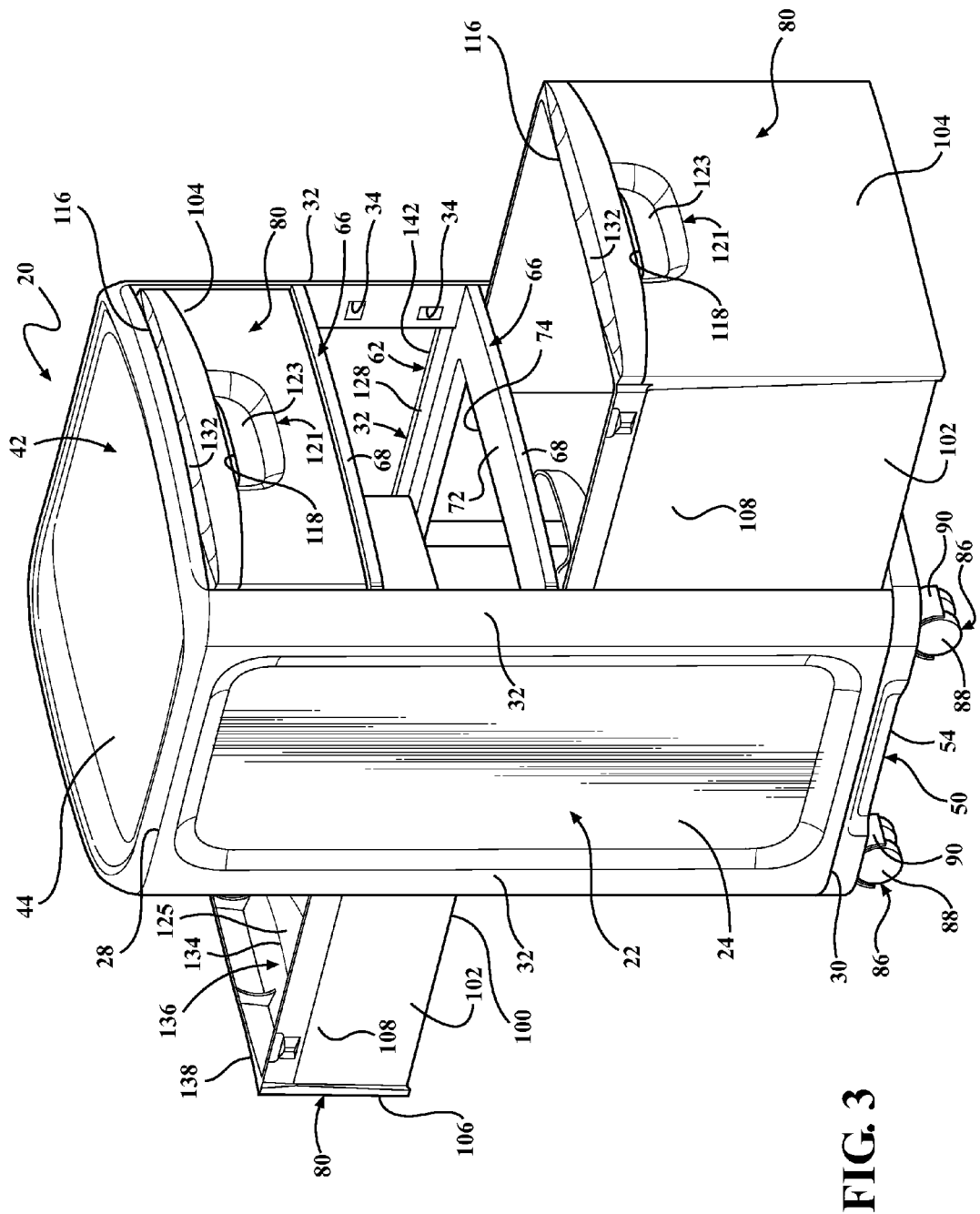
FIG. 3 is a perspective view of the first enabling embodiment with the lower drawer and one of the upper drawers in an open position.
Figure 4:
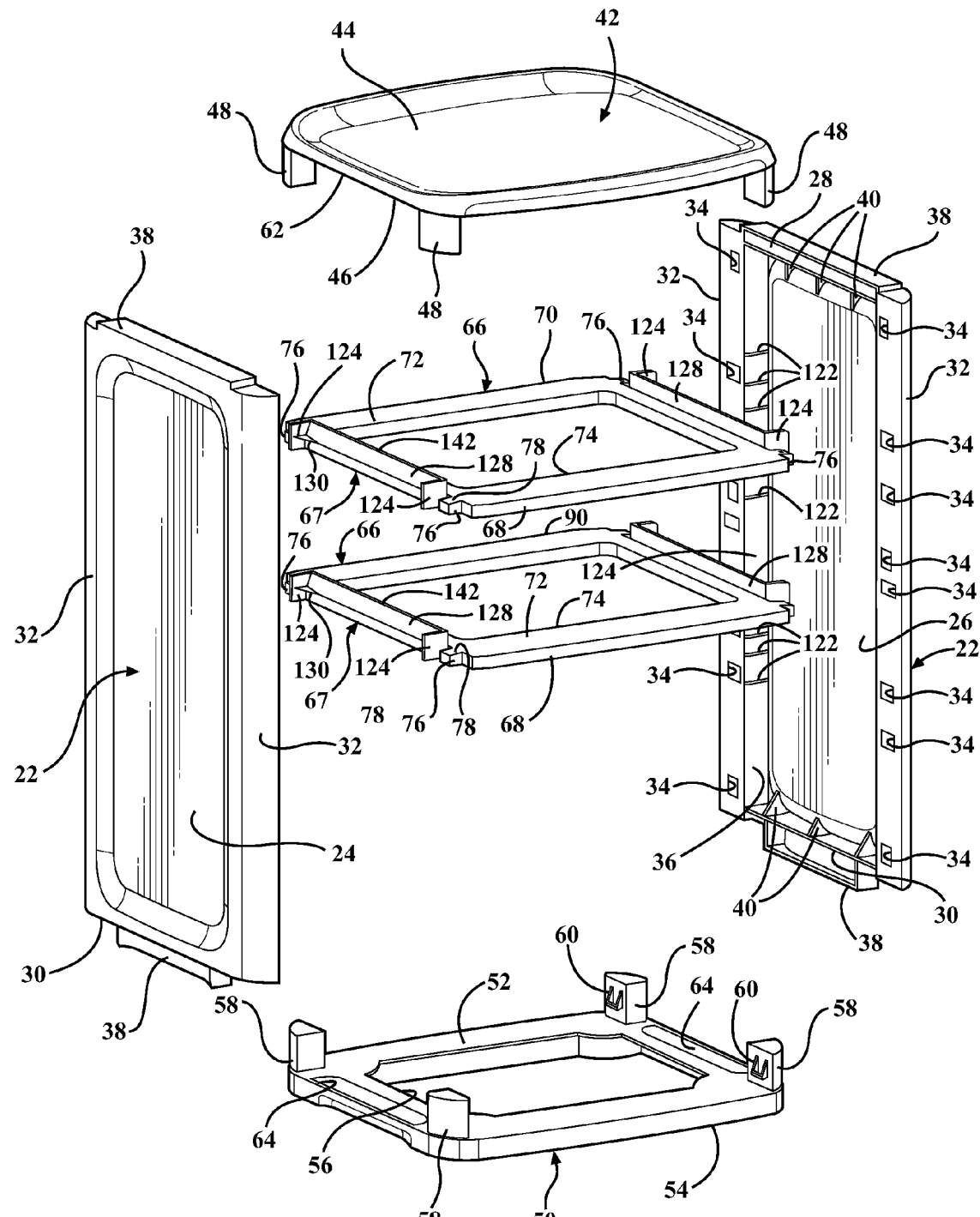
FIG. 4 is an exploded perspective view of the panels, shelves, cover and base of the first enabling embodiment.
Figure 5:
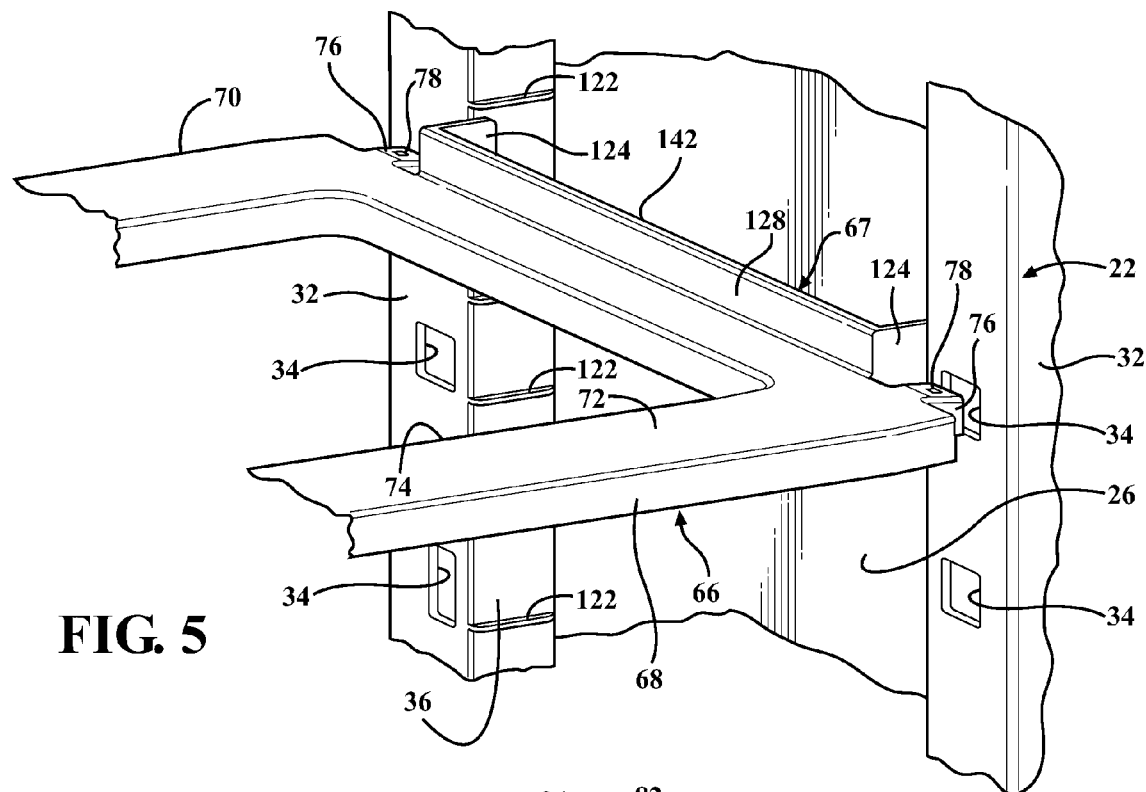
FIG. 5 is a perspective sectional view of one of the shelves and panels of the first enabling embodiment.

Referring to the Figures, wherein like numerals indicate corresponding parts throughout the several views, a cart and drawer assembly 20, 120 is generally shown. The assembly 20, 120 includes a pair of panels 22, generally indicated, of a polypropylene material that have a generally rectangular shape and present an outer surface 24 and an inner surface 26. The panels 22 are disposed in spaced and parallel relationship with one another with the inner surfaces 26 of the panels 22 facing each other. It should be appreciated that the panels 22 could have other shapes such as, but not limited to, an oval or square shape. Further, it should be appreciated that the panels 22 could be made out of other materials such as, but not limited to, other organic polymeric materials or a metal material.

Each of the panels 22 defines a top 28, a bottom 30, and a pair of beams 32 that extend perpendicularly to and between the top 28 and the bottom 30. The outer surface 24 of each of the panels 22 defines a concavity that has a rectangular shape that extends therein adjacent to the top 28, the bottom 30, and the beams 32 of the panels 22. The concavity defines a periphery that has an arc shape. It should be appreciated that the concavity can serve as a gripping surface for users to grasp the panels 22 to aid in assembling or moving the assembly 20, 120.

Each of the beams 32 has a circular segment-shaped cross-section. However, it should be appreciated that the beams 32 could have other cross-sectional shapes such as, but not limited to, a circular or square shaped cross-section. The beams 32 each define a plurality of sockets 34 that are linearly spaced from one another along each of the beams 32. It should be appreciated that any number of sockets 34 could be defined by the beams 32 and that they could have various sizes. Each of the beams 32 presents an interior face 36 that extends in spaced and parallel relationship with another of the interior faces 36.

A projection 38 that has a cuboid shape extends from the top 28 and the bottom 30 of each of the panels 22 between and beyond the beams 32. It should be appreciated that the projection 38 could have other shapes such as, but not limited to, an ovoid shape. A plurality of gussets 40 that have a generally triangular shape extend between the top 28 and inner surface 26 of the panels 22, and the bottom 30 and inner surface 26 of the panels 22, respectively. The gussets 40 extend in spaced and parallel relationship with one another for providing rigidity to the top 28 and the bottom 30. It should be appreciated that there could be any number of gussets 40 and the gussets 40 could have other shapes such as, but not limited to, a square shape or circular shape.

A cover 42 of a polypropylene material is removeably connected with, and extends between the tops 28 of the panels 22. The cover 42 has a generally square shaped cross-section and defines a topside 44, an underside 46, and four covering corners. It should be appreciated that the cover 42 could be made of other material such as, but not limited to, other organic polymeric materials or a metal material. Additionally, it should be appreciated that the cover 42 could have other cross-sectional shapes such as, but not limited to, a circular or oval shape.

Four attaching posts 48, each having a circular segment-shaped cross-section, extend from the underside 46 of the cover 42 adjacent to one of the covering corners and are removeably disposed in one of the beams 32 of the panels 22 at the tops 28 of the panels 22 to connect the cover 42 to the panels 22. In other words, the attaching posts 48 are received by the beams 32 of the panels 22 to connect the cover 42 and panels 22. It should be appreciated that there could be more or fewer attaching posts 48, but there should be an equal number of attaching posts 48 as there are beams 32 on the panels 22. Additionally, it should be appreciated that the attaching posts 48 could have other cross-sectional shapes such as, but not limited to, a circular or square shape, but the shape should match that of the beams 32.

The topside 44 of the cover 42 defines a depression that has a square shape extending therein adjacent to each of the covering corners along a perimeter that has an arc shape for receiving articles such as keys, coins or office supplies, and for inhibiting such articles from falling off the cover 42 during movement of the assembly 20, 120. It should be appreciated that the cover 42 could have other shapes such as, but not limited to, a circular or oval shape.

A base 50 of a polypropylene material is removeably connected with, and extends between the bottoms 30 of the panels 22. The base 50 has a square shaped cross-section and defines an upward face 52, a downward face 54, and four base corners. It should be appreciated that the base 50 could have other cross-sectional shapes such as, but not limited to, a circular shape or an oval shape and could be made of other materials such as, but not limited to, other organic polymeric materials or a metal material. The base 50 further defines a hollow 56 that has a square shape that extends therethrough adjacent to each of the base corners. It should be appreciated that the hollow 56 could have other shapes such as, but not limited to, a circular shape, and it should also be appreciated that the base 50 could alternatively be solid without a hollow 56.

Four affixing posts 58, each having a circular segment-shaped cross-section, extend from the upward face 52 of the base 50 adjacent to one of the base corners and are removeably disposed in one of the beams 32 of the panels 22 at the bottoms 30 of the panels 22 to connect the base 50 to the panels 22. In other words, the beams 32 receive the affixing posts 58 to connect the base 50 and the panels 22. It should be appreciated that there could be more or fewer affixing posts 58, but there should be an equal number of affixing posts 58 as there are beams 32 on the panels 22. Additionally, it should be appreciated that the affixing posts 58 could have other cross-sectional shapes such as, but not limited to, a circular or square shape, but the shape should match that of the beams 32 to allow the affixing posts 58 to be received by the beams 32.

A tab 60 flexibly extends from each of the posts 48, 58 and is removeably disposed in one of the sockets 34 of the beams 32 of the panels 22 for removeably securing the cover 42 and the base 50 to the panels 22. In other words, the tabs 60 flexibly latch into the sockets 34, and can be pressed inwardly by a user to allow the posts 48, 58 to slide out of the beams 32 to disconnect the cover 42 from the panels 22. It should be appreciated that other fastening mechanisms could be used as an alternative to the tabs 60 to secure the posts 48, 58 to the beams 32 such as, but not limited to, nuts and bolts or pins.

The underside 46 of the cover 42 defines a pair of recesses 62 that have a rectangular shape that extend therein between two of the attaching posts 48. The recesses 62 removeably receive the projections 38 of the tops 28 of the panels 22 for aligning the cover 42 with the panels 22. Further, the upward face 52 of the base 50 defines a pair of openings 64 that have a rectangular shape that extend therein between two of the affixing posts 58 for removeably receiving the projections 38 of the bottoms 30 of the panels 22 for aligning the base 50 with the panels 22. It should be appreciated that the recesses 62 and openings 64 could have other shapes such as, but not limited to, an ovoid shape, but should match the shape of the projections 38 for receiving the projections 38.

A plurality of shelves 66, 166 of a polypropylene material and having a rectangular shaped cross-section are removeably disposed between the inner surfaces 26 of the panels 22 in perpendicular relationship with the panels 22. It should be appreciated that the shelves 66, 166 could have other cross-sectional shapes such as, but not limited to, an oval shape. Further, it should be appreciated that the assembly 20, 120 could include any number of shelves 66, 166. The shelves 66, 166 each define a pair of mounting sides 67, 167 that extend in spaced and parallel relationship with one another. Further, the shelves 66, 166 each define a front edge 68, 168 and a rear edge 70, 170 that extend between the mounting sides 67, 167 and an upper surface 72 and a lower surface 73. Each of the shelves 66, 166 further define a void 74 that has a square shape that extends therethrough adjacent to the mounting sides 67, 167, the front edge 68, 168 and the rear edge 70, 170 to reduce the weight of the shelves 66, 166 and make the shelves 66, 166 more compact for storage. It should be appreciated that the void 74 could have other shapes such as, but not limited to, a circular shape, and it should be appreciated that the shelves 66, 166 could alternatively be solid, without a void 74. Further, it should be appreciated that the shelves 66, 166 could be made out of other materials such as, but not limited to, other organic polymeric materials or a metal material.

A pair of plugs 76, each having a cuboid shape, are spaced from one another and extend from each of the mounting sides 67, 167 of each of the shelves 66, 166, each disposed in one of the sockets 34 of the beams 32 to connect the shelves 66, 166 and the panels 22. A hook 78 flexibly extends from each of the plugs 76 to removeably connect the plugs 76 to the sockets 34. In other words, once the plug 76 is inserted into the socket 34, the hook 78 engages the inside surface of the beam 32 to inhibit movement of the plug 76 outside of the socket 34, but the plug 76 may be removed from the socket 34 with the application of a sufficient amount of force. It should be appreciated that the plugs 76 and sockets 34 could have various cross-sectional shapes such as, but not limited to, a circular or oval shape, but they should have the same shape as one another. Further, it should be appreciated that the plugs 76 and sockets 34 could be various sizes. It should also be appreciated that each of the plugs 76 can be positioned in any of the sockets 34, therefore allowing the shelves 66, 166 to be positioned at various positions along the beams 32, allowing the assembly 20, 120 to accommodate drawers 80, 180 of various sizes.

Figure 7:
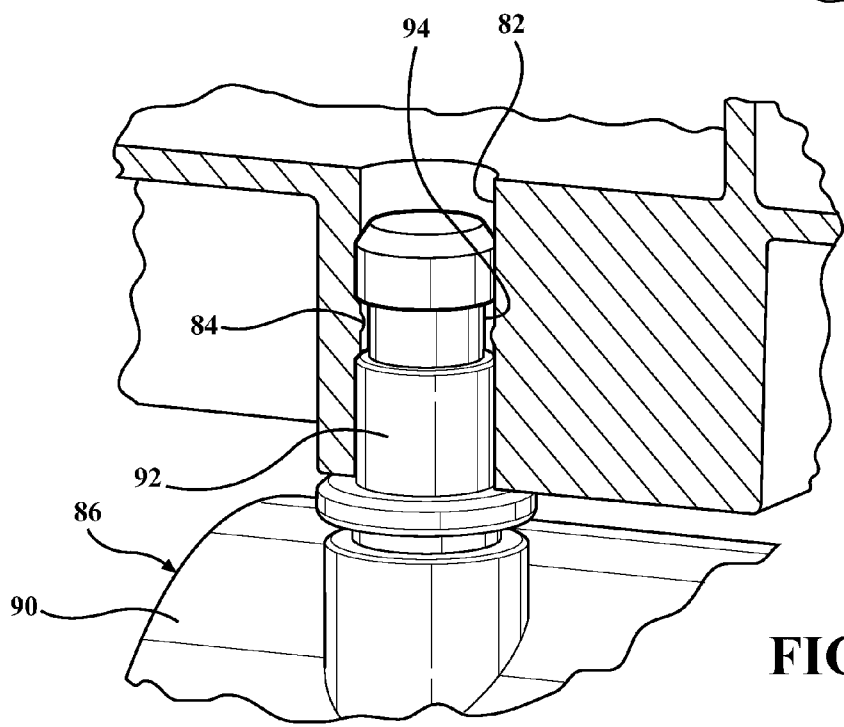
FIG. 7 is a perspective cutaway view of the rod of a caster disposed inside the bore of the base.
Figure 6:
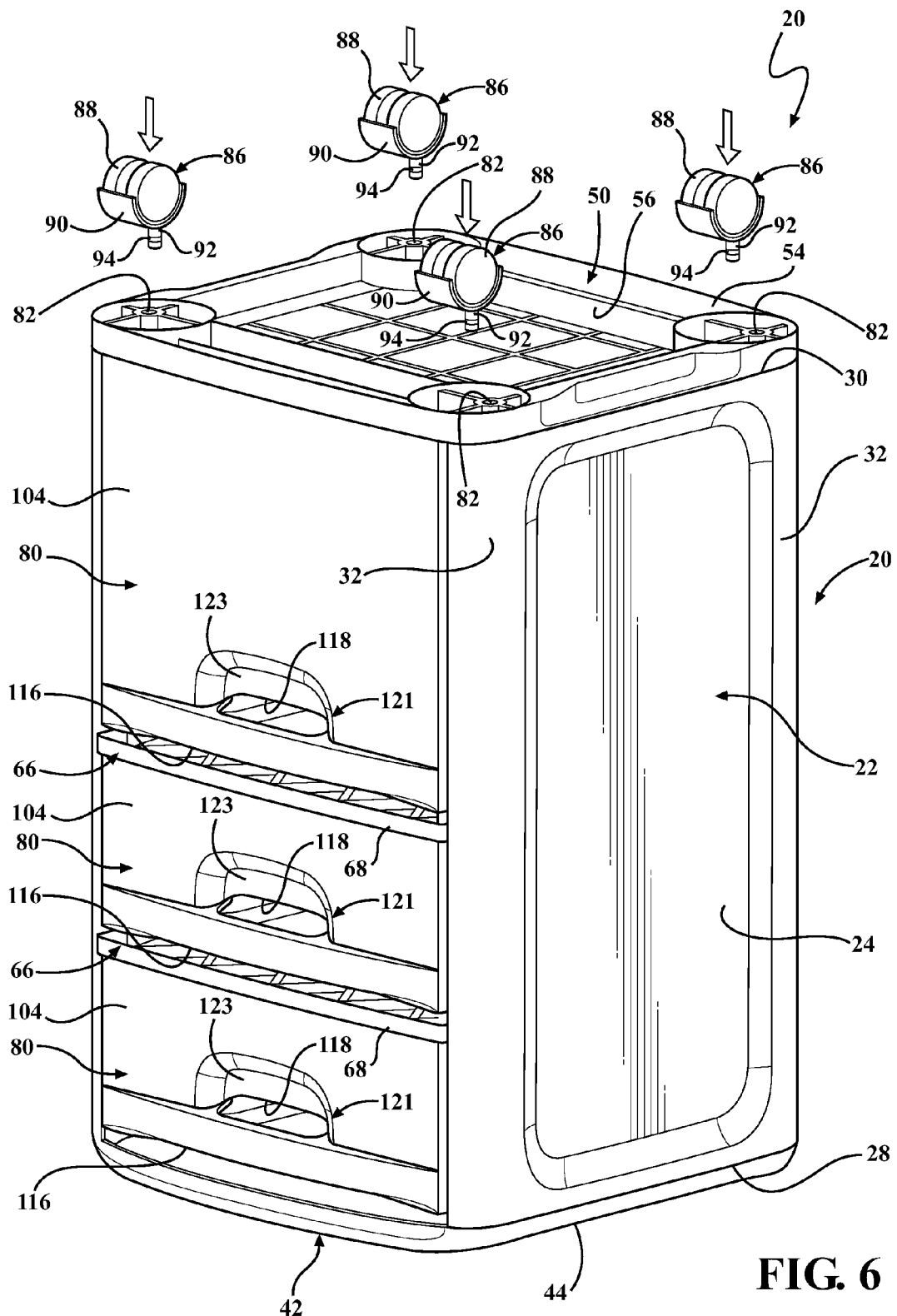
FIG. 6 is a perspective exploded view of the assembly of the first enabling embodiment with the casters removed from the base.

As best presented in FIGS. 6 and 7, the downward face 54 of the base 50 defines four bores 82, each extending therein adjacent to one of the base corners. Each of the bores 82 presents a retaining ring 84 that extends annularly and radially inwardly. A plurality of casters 86 are each removeably connected with the downward face 54 of the base 50 adjacent to each of the base corners for allowing the assembly 20, 120 to be moved across the ground. Each of the casters 86 includes a wheel 88 and a shield 90 having an arc shape that is partially disposed about and connected with the wheel 88. A rod 92 extends from each of the shields 90 for being disposed in one of the bores 82 of the base 50 to connect the caster 86 and the base 50. Each of the rods 92 defines an annular groove 94 that extends radially therein for receiving the retaining ring 84 of one of the bores 82 for restricting sliding movement of the caster 86 relative to the orifice. It should be appreciated any number of casters 86 could be used, and casters 86 of other styles known in the art could be used. Furthermore, a plurality of legs could be connected to the bores 82 of the base 50 or to other areas of the base 50 as an alternative to the casters 86.

A pair of upper drawers 80, 180 that have a generally cuboid shape are each slideably disposed along the upper surface 72 of one of the shelves 66, 166 and between the panels 22. A lower drawer 80, 180 that has a generally cuboid shape is slideably disposed along the upward face 52 of the base 50. It should be appreciated that the assembly 20, 120 could include any number of drawers 80, 180 of various sizes. Furthermore, it should be appreciated that the drawers 80, 100 could be of various sizes and could be of configurations such as, but not limited to, a tray style or closed container.

Each of the drawers 80, 180 includes a lower wall 100, a pair of sidewalls 102 that extend perpendicularly from the lower wall 100, and a forward wall 104 and back wall 106 that extend perpendicularly from the lower wall 100 and between the sidewalls 102. Each of the sidewalls 102 includes a foundation portion that engages the lower wall 100 and a terminal portion 108 that is spaced from the foundation portion. As best presented in FIG. 8A, the terminal portion 108 of each of the sidewalls 102 is divided into an inward segment 110 and an outward segment 112 that extend generally in spaced and parallel relationship with one another to define a pocket 114 therebetween for receiving a hanging hook 78 of a file or other article that is contained in the drawer 80, 180. It should be appreciated that any number of drawers 80, 180 of various shapes and sizes could be used in the assembly 20, 120.

The forward wall 104 and back wall 106 of each of the drawers 80, 180 includes a low border engaging the lower wall 100, and an upper border 116 extending in spaced and parallel relationship with the low border. The forward wall 104 of each of the drawers 80, 180 presents a front handle 121 for allowing a user to slide the drawer 80 along one of the shelves 66 away from and between panels 22. The front handle 121 includes an indentation 123 that is defined by the forward wall 104 adjacent to the upper border 116. The front handle 121 further includes a front slot 118 that has a generally oval shape and is defined by the forward wall 104 in the indentation 123.

A plurality of ribs 122 extend from the interior face 36 of the beams 32 and are spaced along the tubes 32 from one another. A pair of ears 124, 224 extend from the shelf 66, 166 and engage an adjacent pair of ribs 122 on the beams 32 to maintain the panels 22 in spaced and parallel relationship with one another, and perpendicular to the shelf 66, 166. It should be appreciated that the ears 124, 224 and ribs 122 are able to maintain the panels 22 in parallel relationship with one another and perpendicular to the shelf 66, 166 when external forces are applied to the panels 22 or shelves 66, 166. This is particularly advantageous in comparison to other cart and drawer assemblies 20, 120 which often exclusively rely upon an arrangement of plugs 76 and sockets 34, which commonly allow the panels 22 to pivot about the plug 76 in response to external forces being applied to the panels 22 or shelves 66. It should be appreciated that the ears and ribs could have other shapes so long as they matchup with one another. For example, the ribs 122 could be angled upwardly toward the top 28 of the panel 22 and the ears 124, 224 could extend at a downward angle relative to the upper surface 72 of the shelf 66, 166. It should further be appreciated that the ears 124, 224 could have other shapes such as, but not limited to, an oval shape, so long as they are able to be disposed between an adjacent pair of ribs 122 to prevent rotation of the panels 22 relative to the shelves 66, 166 and ground.

A plate 128, 228 that has a rectangular shape overlies each of the mounting sides 32, and a pair of the ears 124, 224 extend from each of the plates 128, 228 in spaced and parallel relationship with one another. A pair of webs 130, each having a generally triangular shape, extend between the plate 128, 228 and one of the ears 124 in coplanar relationship with one of the shelves 66, 166 for providing for increased rigidity of the ears 124, 224. Each of the plates 128, 228 and the ears 124, 224 of the shelves 66, 166 define an uppermost periphery 142 extending upwardly from the upper surface 72 of the shelf 66 to provide for additional surface area of the ears 124 on the beams 32.

Figure 11:
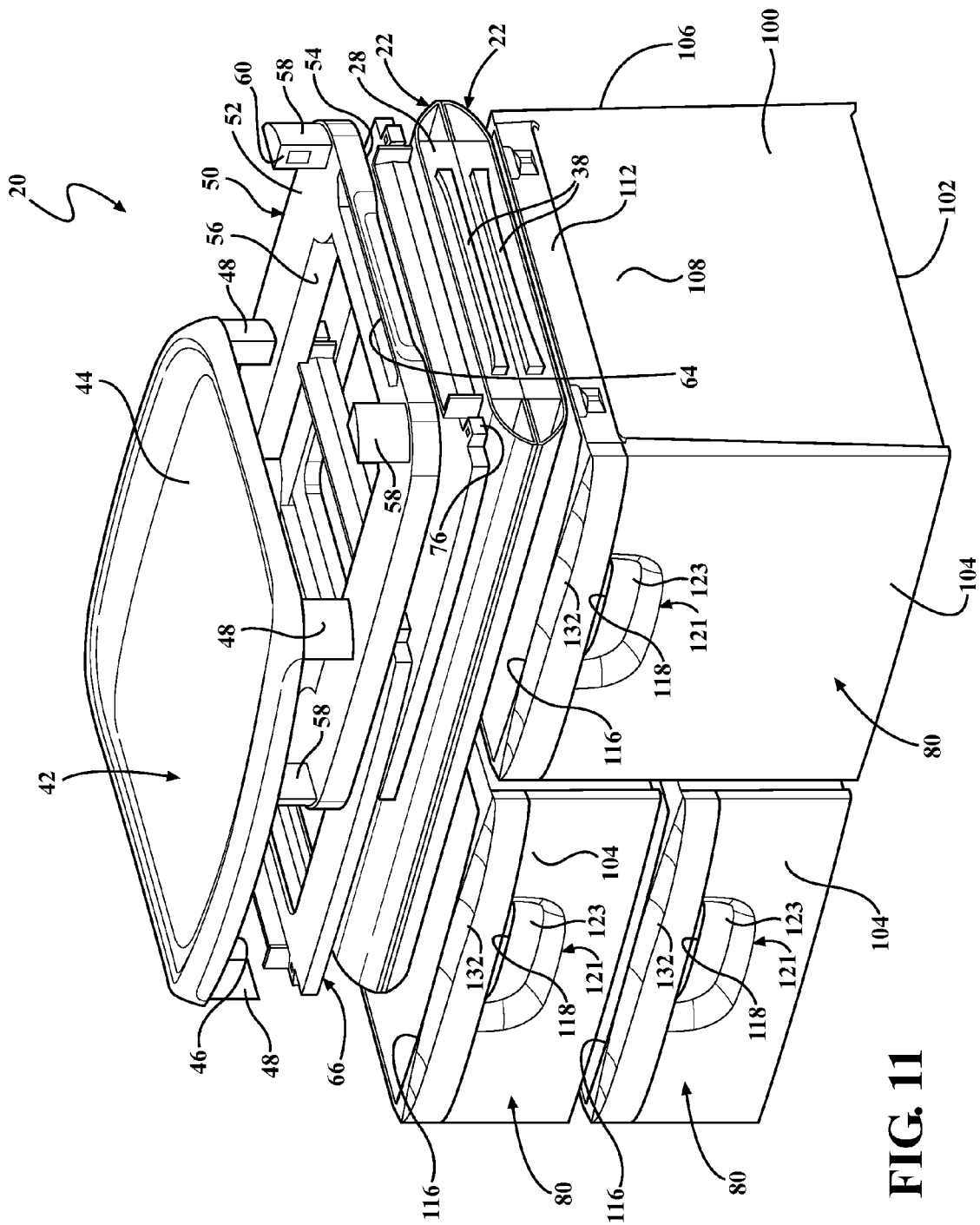
FIG. 11 is a perspective view of the first enabling embodiment in a collapsed position.
Figure 12:
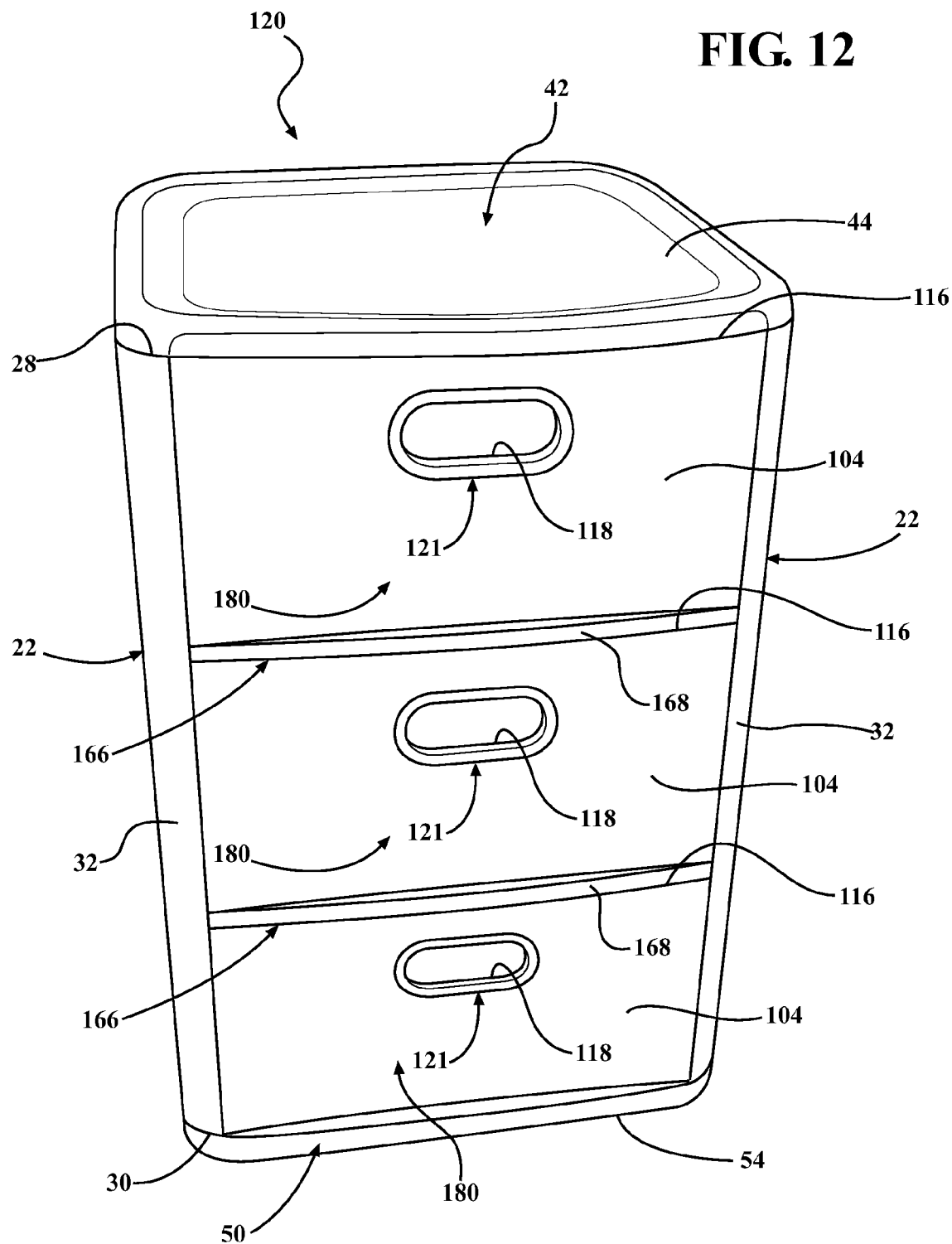
FIG. 12 is a perspective view of the second enabling embodiment.
Figure 13:
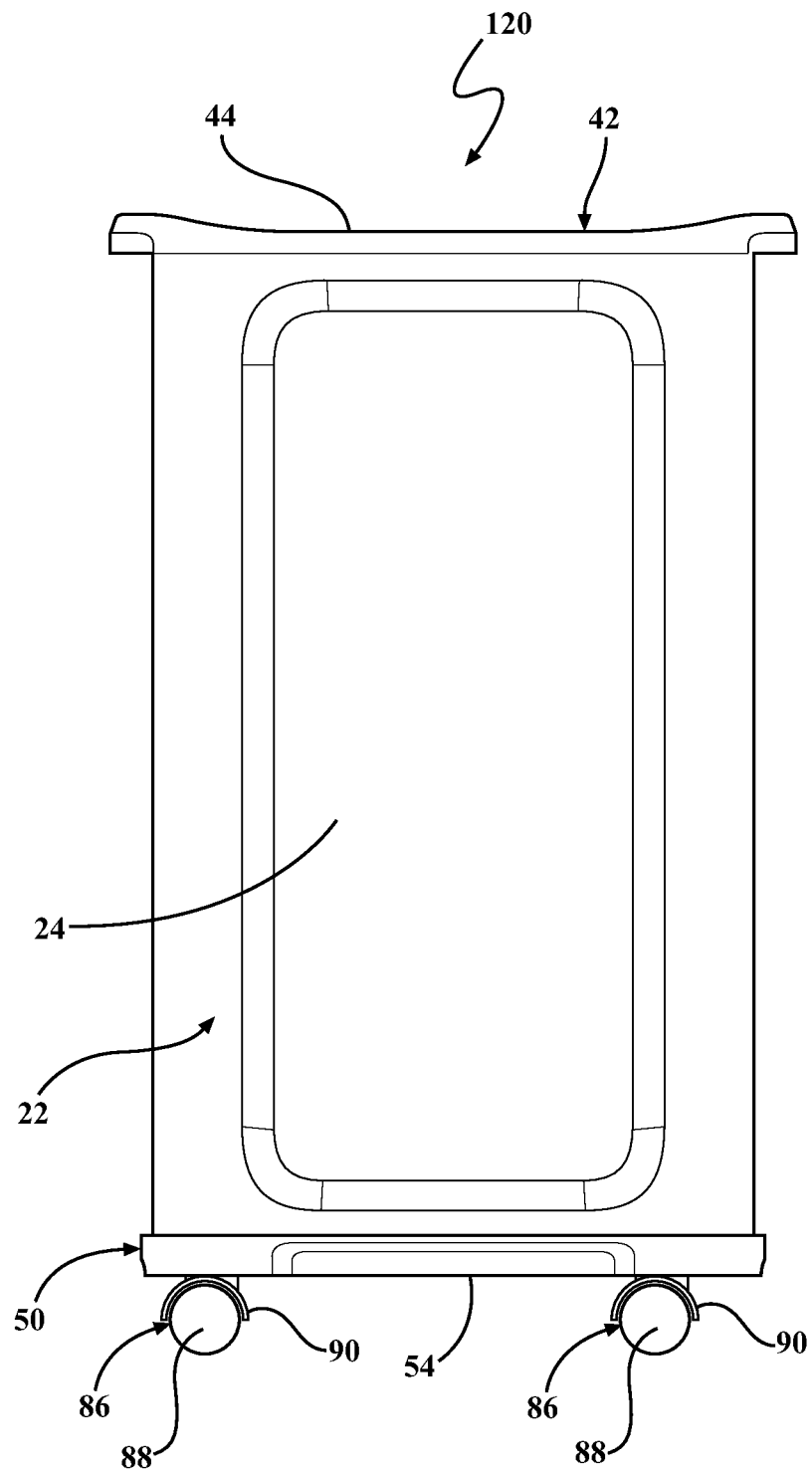
FIG. 13 is a side view of the second enabling embodiment.
Figure 14:
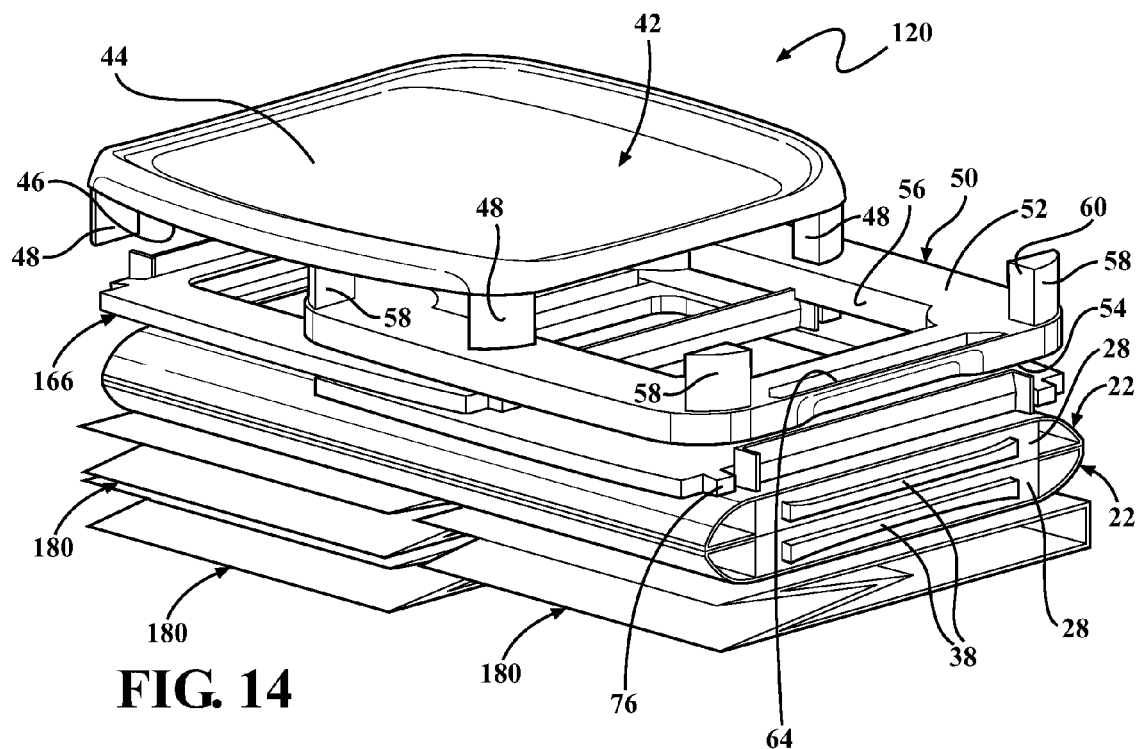
FIG. 14 is a perspective view of the second enabling embodiment in a collapsed position.
Figure 15:
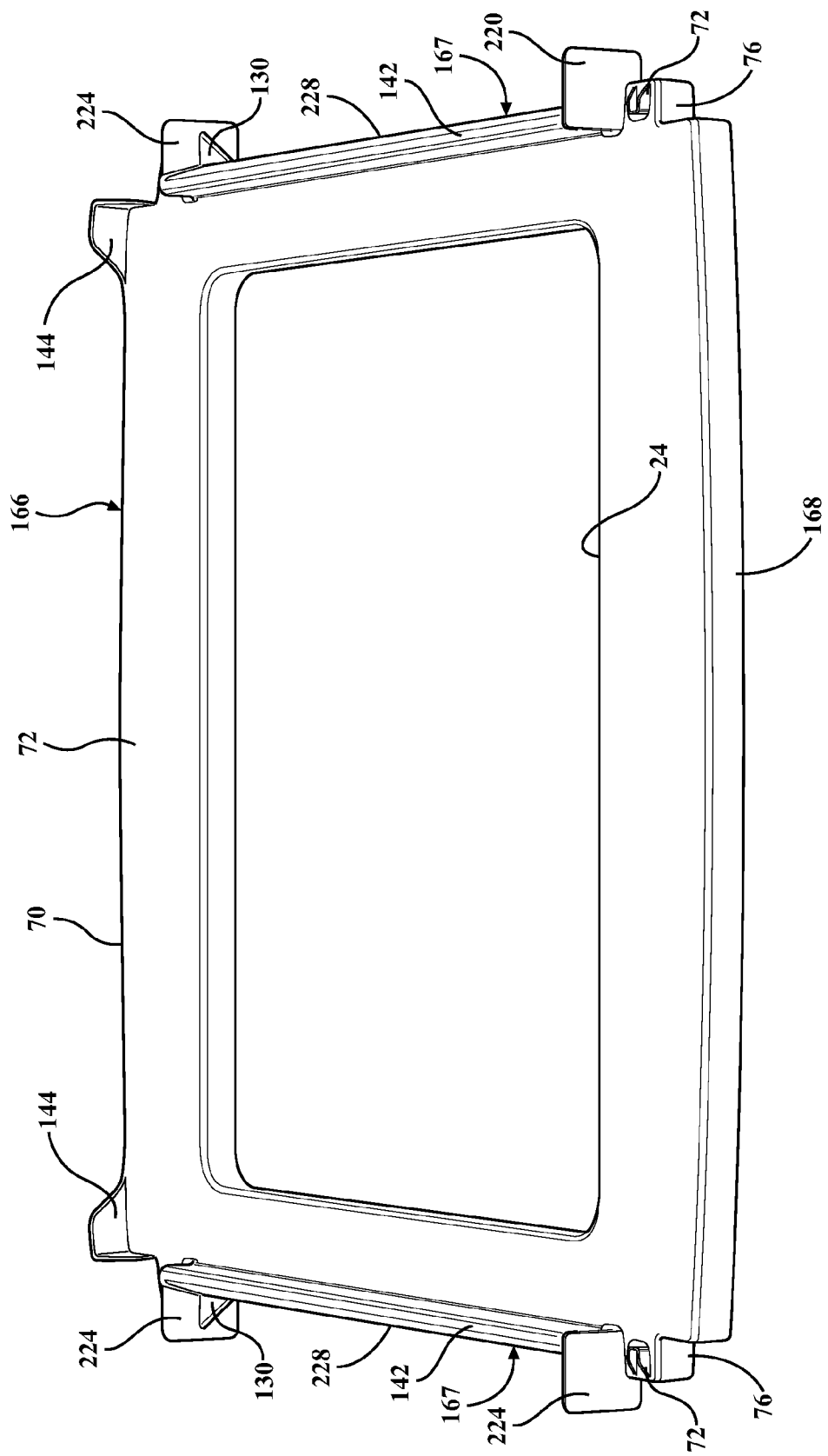
FIG. 15 is an top perspective view of one of the shelves of the second enabling embodiment.
Figure 16:
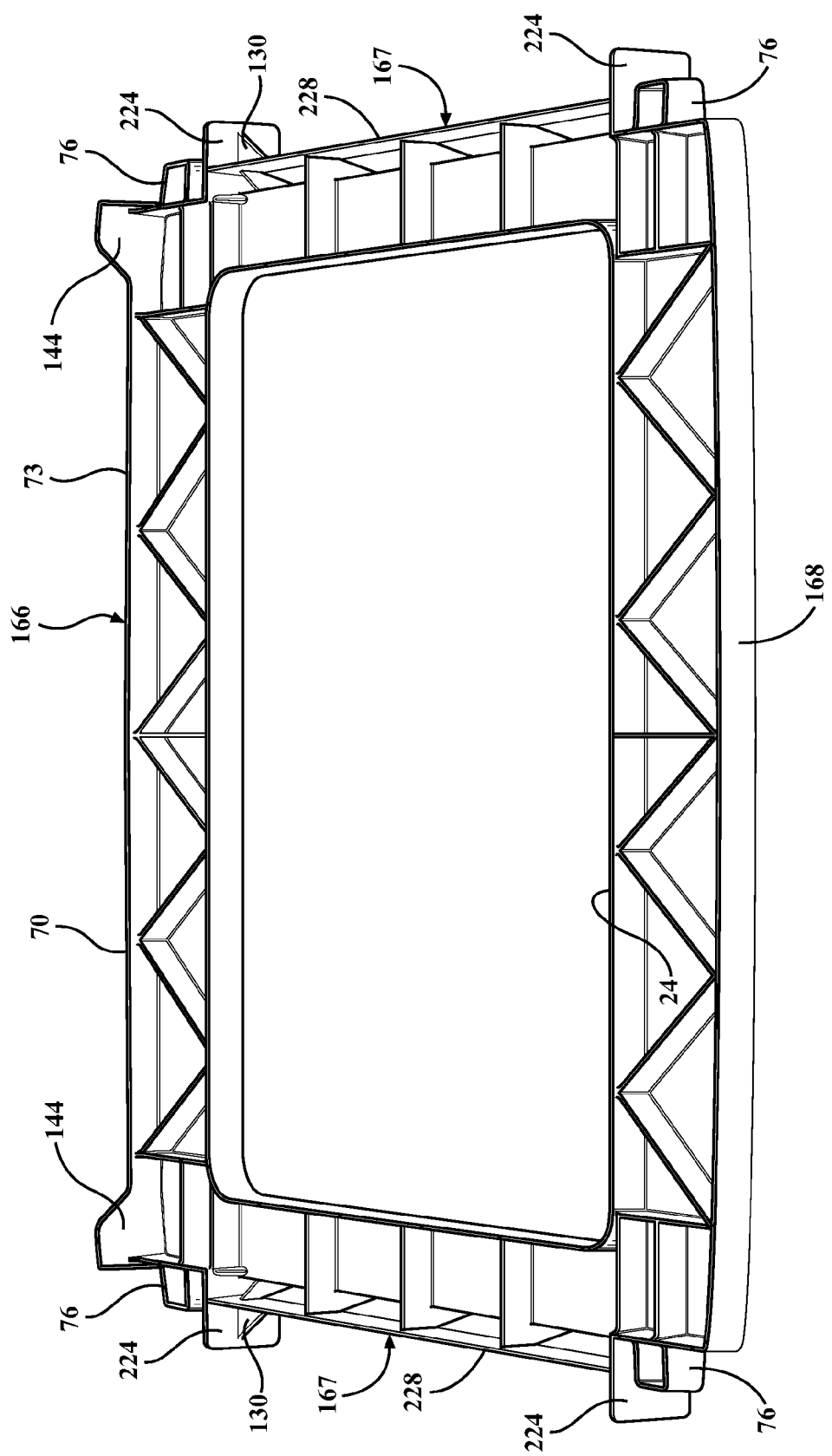
FIG. 16 is a bottom perspective view of one of the shelves of the second enabling embodiment.

It should be appreciated that because the various components of the assembly 20, 120 are removeably connected to one another, the assembly 20, 120 can be disassembled into a collapsed position as best presented in FIGS. 11 and 14, advantageously allowing the assembly 20, 120 to be stored in compact locations. Furthermore, it should be appreciated that the assembly 20, 120 could be sold in the assembled or collapsed positions.

In a first enabling embodiment as best presented in FIGS. 1-11, the forward wall 104 of each of the drawers 80 further defines a front groove 132 that extends at an angle from the upper border 116 for providing for a surface for a user to rest their thumb while grasping the front handle 121.

Further, the back wall 106 of each of the drawers 80 presents a rearward handle 136 for allowing a user to slide the drawer 80 along one of the shelves 66 away from and between panels 22. The rearward handle 136 includes a rear indentation 125 that is defined by the back wall 106. The rearward handle 136 further includes a back slot 134 that has a generally oval shape and is defined by the back wall 106. It should be appreciated that the back slot 134 could have other shapes such as, but not limited to, a rectangular shape. The back wall 106 further defines a back groove 138 that extends at an angle from the upper border 116 of the back wall 106 for providing for a surface for a user to rest their thumb while grasping the rearward handle 136. It should be appreciated that the drawers 80 of the first enabling embodiment are advantageously able to slide away from the panels 22 in both the front and back directions because of the presence of the rearward handle 136.

Figure 8:
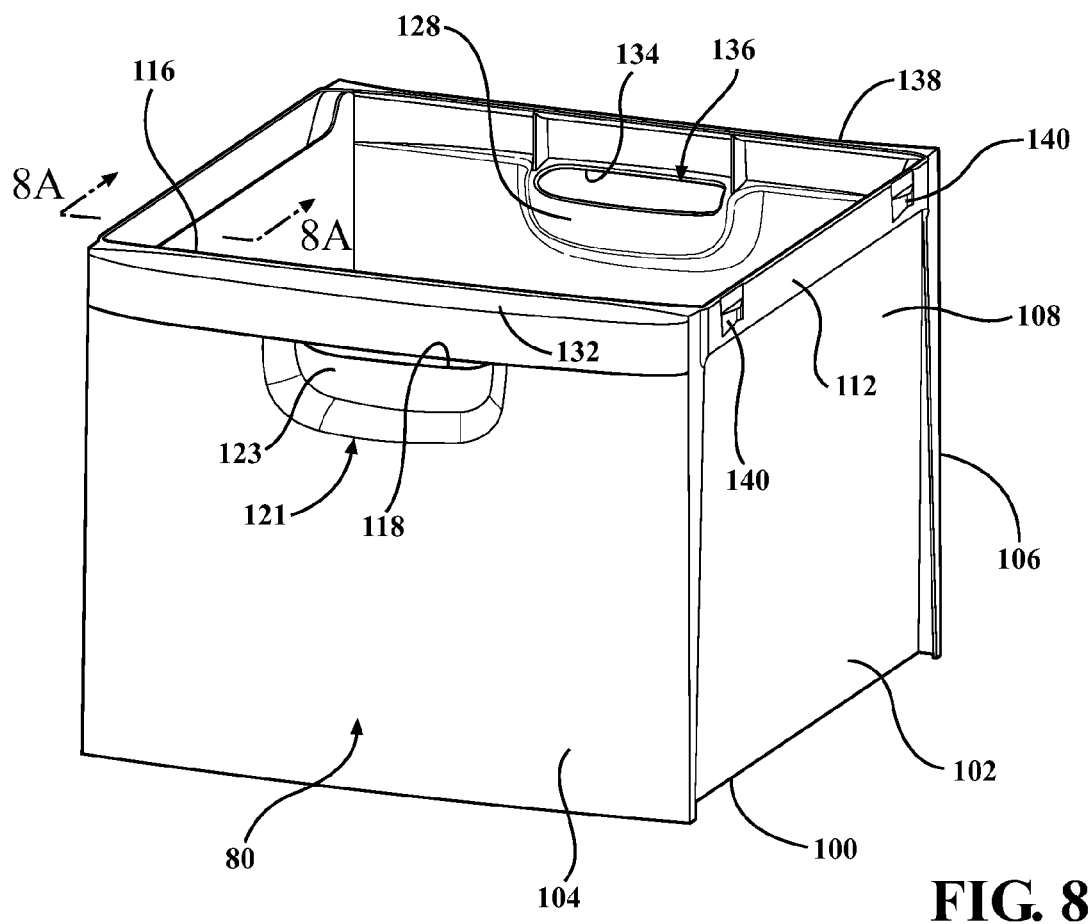
FIG. 8 is a perspective view of one of the drawers of the first enabling embodiment.
Figure 8A:
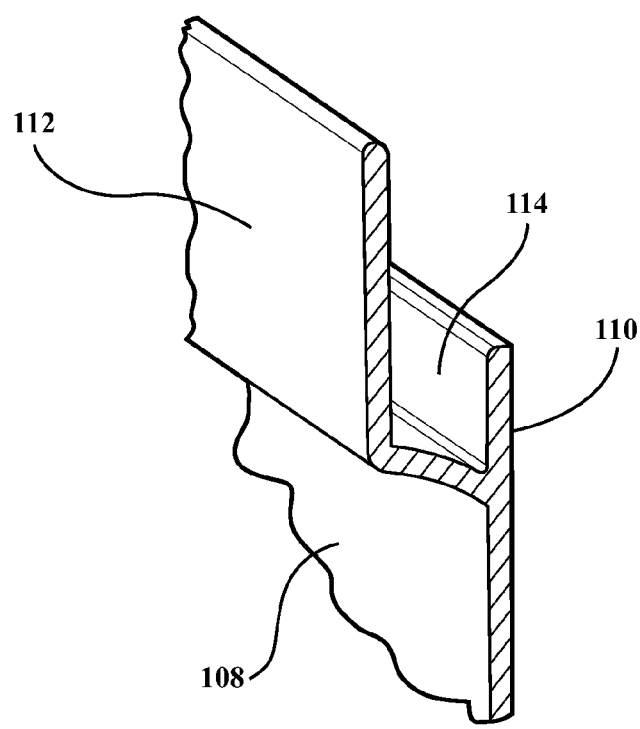
FIG. 8A is a side cutaway view of the sidewall of one of the drawers of the first enabling embodiment.

Further, in the first enabling embodiment as best presented in FIGS. 8-10, a pair of ramps 140 that have a generally triangular shape are linearly spaced from one another and extend away from the outward surface of the sidewalls 102 of each of the drawers 80 for being flexibly wedged against the beams 32 of the panels 22 for inhibiting sliding movement of the drawer 80 relative to the panels 22. In other words, the ramps 140 engage the beams 32 to resist movement of the drawers 80 off the shelves 66 to bias the shelves 66 in a closed position when the shelves 66 are not in use. It should be appreciated, however, that the shelves 66 can be slid to an open position in response to a predetermined force being applied on the shelves 66. In the first enabling embodiment, each of the drawers 80 are of a polypropylene material, however it should be appreciated that the drawers 80 could be made of other materials such as, but not limited to, other organic polymeric materials, a metal material, or a fabric material. It should further be appreciated that the drawers 80 could alternatively be made without the ramps 80.

In a second enabling embodiment as best presented in FIGS. 12-16, a pair of stoppers 144 that have a generally triangular shape extend upwardly from the upper surface 72 of each of the shelves 166 adjacent to the rear edge 70 of each of the shelves 166, and a pair of stoppers 144 that have a generally triangular shape extend downwardly from the lower surface 73 of each of the shelves 166 adjacent to the rear edge 70 of each of the shelves 166 for blocking the drawers 180 to prevent the drawers 180 from sliding past the stoppers 144. Accordingly, the stoppers 144 of each shelf 166 prevent drawers 180 above and below the shelves 166 from sliding past the stoppers 144. It should be appreciated that any number of stoppers 144 could extend from the upper surface 72 and the lower surface 73 and the stoppers 144 could have other shapes such as, but not limited to, a cuboid shape. It should further be appreciated that one or more stoppers 144 could extend from only the upper or lower surfaces 72, 73, respectively.

The drawers 180 are made of a fabric material, allowing the drawers 180 to be placed in a compacted position as best presented in FIG. 14, advantageously allowing the drawers 180 to be stored in smaller areas. However, it should be appreciated that the drawers 180 could be made of other materials such as, but not limited to, an organic polymeric material or metal material.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A cart and drawer assembly (20, 120) comprising;
a pair of panels (22) each having an inner surface (26) disposed in spaced and parallel relationship with one another with said inner surfaces (26) facing each other,
each of said panels (22) defining a pair of beams (32) extending in spaced and parallel relationship with one another,
at least one shelf (66, 166) disposed between said panels (22) in perpendicular relationship to said panels (22),
said shelf (66) presenting an upper surface (72) and a lower surface (73),
a plurality of sockets (34) defined by said beams (32),
a plurality of plugs (76) each extending from said shelf (66, 166) and into one of said sockets (34) of said beams (32) to support said shelf (66, 166) by said panels (22),
and characterized by,
at least one pair of ribs (122) extending from each of said beams (32) transversely to and disposed along said beams (32),
a plurality of ears (124, 224) each extending from said shelf (66, 166) adjacent to one of said plugs (76) with each of said ears (124, 224) engaging both of said ribs (122) of the adjacent pairs of said ribs (122) on said beams (32) to resist external forces and maintain said panels (22) in spaced and parallel relationship with one another and perpendicular to said shelf (66, 166),
each of said ears being parallel to one another and (124, 224) extending perpendicularly and vertically from one of said surfaces (72, 73) of said shelf (66).

2. The apparatus as set forth in claim 1 wherein said shelf (66, 166) extends between a pair of mounting sides (67, 167) each extending adjacent to said inner surface (26) of one of said panels (22),
said ears (124, 224) include a pair of ears (124, 224) in spaced and parallel relationship with one another extending from each of said mounting sides (67, 167).

3. The apparatus as set forth in claim 2 wherein each of said mounting sides (67, 167) includes a plate (128, 228) extending between an adjacent pair of said beams (32),
said pair of ears (124, 224) extend from each of said plates (128, 228) between said adjacent ribs (122).

4. The apparatus as set forth in claim 3 wherein a web (130) extends between each of said ears (124, 224) and one of said plates (128, 228) for providing for increased rigidity of ears (124, 224).

5. The apparatus as set forth in claim 3 wherein each of said beams (32) defines a plurality of said sockets (34) spaced along said beams (32),
said plurality of plugs includes a pair of plugs (76) extending from each of said mounting sides (67, 167) each being disposed in one of said sockets (34) to connect said shelves (66, 166) to said panels (22),
said pair of ears (124, 224) of each of said mounting sides (67, 167) are disposed between said pair of plugs (76) of each of said mounting sides (67, 167).

6. The apparatus as set forth in claim 1 wherein said shelf (66, 166) further presents a rear edge (70) extending perpendicularly to said inner surface (26) of said panels (22),
a drawer (80) is slideably disposed on said upper surface (72) of said shelf (66, 166) between said panels (22).

7. The apparatus as set forth in claim 6 wherein at least one ramp (140) extends from said drawer (80) and is flexibly wedged against one of said beams (32) for inhibiting sliding movement of said drawers (80) relative to said panels (22).

8. The apparatus as set forth in claim 7 wherein said drawer (80) includes a pair of sidewalls (102) each adjacent to one of said panels (22),
said ramp (140) includes a pair of ramps (140) extending from each of said sidewalls (102),
said ramps (140) are linearly spaced from one another.

9. The apparatus as set forth in claim 6 and further including at least one stopper (144) extending upwardly from said upper surface (72) of said shelf (166) adjacent to said rear edge (70) of said shelf (166) for preventing said drawer (80) from sliding past said stopper (144).

10. The apparatus as set forth in claim 9 and further including a drawer (80) being slideably disposed below said lower surface (73) of said shelf (66, 166) between said panels (22),
    at least one stopper (144) extending downwardly from said lower surface (73) of said shelf (166) adjacent to said rear edge (70) of said shelf (166) for preventing said drawer (80) disposed below said lower surface (73) from sliding past said stopper (144).

11. The apparatus as set forth in claim 10 wherein said stopper (144) includes a pair of stoppers (144) spaced from one another extending upwardly from said upper surface (72) of said shelf (166) adjacent to said rear edge (70) of said shelf (166) and a pair of stoppers (144) spaced from one another extending downwardly from said lower surface (73) of said shelf (166) adjacent to said rear edge (70) of said shelf (166).

12. The apparatus as set forth in claim 1 wherein said ears (124, 224) each have a square shape.

13. The apparatus as set forth in claim 1 wherein said sockets (34) extend into said beams (32) in an inward direction perpendicular to said inner surface (26) of said panels (22),
    each of said beams (32) has an interior face (36) extending in said inward direction and facing another of said interior faces (36),
    said plurality of ribs (122) are disposed on said interior faces (36) of said beams (32) and extending in said inward direction to allow said plugs (76) to be received by said sockets (34) at the same time that said ears (124, 224) are received by said ribs (122).

14. The apparatus as set forth in claim 1 further including a plate (128, 228) extending from said one surface (72, 73) of said shelf (66) between a pair of said ears (124, 224) to a periphery (142).

15. The apparatus as set forth in claim 14 including a web (130) extending between each of said pair of said ears (124, 224) and said plate (128, 228) extending between said pair of said ears (124, 224) for providing for increased rigidity of said ears (124, 224).

16. A cart and drawer assembly (20) comprising;
    a pair of panels (22) of a polypropylene material having a generally rectangular shape presenting an outer surface (24) and an inner surface (26) disposed in spaced and parallel relationship with one another with said inner surfaces (26) of said panels (22) facing each other,
    each of said panels (22) defining a top (28) and a bottom (30) and a pair of beams (32) having a circular segment-shaped cross-section extending perpendicularly to and between said top (28) and said bottom (30),
    said outer surface (24) of each of said panels (22) defining a concavity having a rectangular shape extending therein adjacent to said top (28) and said bottom (30) and said beams (32) of said panels (22),
    said concavity defining a periphery having an arc shape,
    said beams (32) defining a plurality of sockets (34) being spaced along each of said beams (32),
    each of said beams (32) presenting an interior face (36) extending in spaced and parallel relationship with another of said interior faces (36) and facing another of said interior faces (36),
    a projection (38) having a cuboid shape extending from said top (28) and said bottom (30) of each of said panels (22) between and beyond said beams (32),
    a plurality of gussets (40) having a generally triangular shape extending between said top (28) and said inner surface (26) and said bottom (30) and said inner surface (26) of each of said panels (22) in spaced and parallel relationship with one another for providing rigidity to said top (28) and said bottom (30),
    a cover (42) of a polypropylene material removeably connected with and extending between said tops (28) of said panels (22),
    said cover (42) having a generally square shaped cross-section and defining a topside (44) and an underside (46) and four covering corners,
    four attaching posts (48) each having a circular segment-shaped cross-section and extending from said underside (46) of said cover (42) adjacent to one of said covering corners and removeably disposed in one of said beams (32) of said panels (22) at said tops (28) of said panels (22) to connect said cover (42) to said panels (22),
    said topside (44) of said cover (42) defining a depression having a square shape extending therein adjacent to each of said covering corners along a perimeter having an arc shape,
    a base (50) of a polypropylene material removeably connected with and extending between said bottoms (30) of said panels (22),
    said base (50) having a square shaped cross-section and defining an upward face (52) and a downward face (54) and four base corners,
    four affixing posts (58) each having a circular segment-shaped cross-section extending from said upward face (52) of said base (50) adjacent to one of said base corners removeably disposed in one of said beams (32) of said panels (22) at said bottoms (30) of said panels (22) to connect said base (50) to said panels (22),
    said base (50) defining a hollow (56) having a square shape extending therethrough adjacent to each of said base (50) corners,
    a tab (60) flexibly extending from each of said posts (48, 58) removeably disposed in one of said sockets (34) of said beams (32) of said panels (22) for removeably securing said cover (42) and said base (50) to said panels (22),
    said underside (46) of said cover (42) defining a pair of recesses (62) having a rectangular shape extending therein between two of said attaching posts (48) removeably receiving said projections (38) of said tops (28) of said panels (22) for aligning said cover (42) with said panels (22),
    said upward face (52) of said base (50) defining a pair of openings (64) having a rectangular shape extending therein between two of said affixing posts (58) removeably receiving said projections (38) of said bottoms (30) of said panels (22) for aligning said base (50) with said panels (22),
    a plurality of shelves (66, 166) of a polypropylene material having a rectangular shaped cross-section removeably disposed between said inner surfaces (26) of said panels (22) in perpendicular relationship with said panels (22),
    said shelves (66, 166) each defining a pair of mounting sides (67, 167) extending in spaced and parallel relationship with one another,
    said shelves (66, 166) each further defining a front edge (68) and a rear edge (70) extending between said mounting sides (67, 167) and an upper surface (72),
    each of said shelves (66, 166) further defining a void (74) having a square shape extending therethrough adjacent to said mounting sides (67, 167) and said front edge (68) and said rear edge (70),
    a pair of plugs (76) being spaced from one another extending away from each of said mounting sides (67, 167) of each of said shelves (66, 166) each extending into one of said sockets (34) of said beams (32) to support said shelves (66, 166) by said panels (22), each of said plugs (76) including a hook (78) flexibly extending from each of said plugs (76) removeably fixing said plugs (76) to one of said sockets (34), said downward face (54) of said base (50) defining four bores (82) each extending therein adjacent to one of said base corners, each of said bores (82) presenting a retaining ring (84) extending annularly and radially inwardly, a plurality of casters (86) each removeably connected with said downward face (54) of said base (50) adjacent to each of said base corners, each of said casters (86) including a wheel (88) and a shield (90) having an arc shape partially disposed about and connected with said wheel (88), a rod (92) extending from each of said shields (90) for being disposed in one of said bores (82) of said base (50) to connect said caster (86) and said base (50), each of said rods (92) defining a groove (94) being annular extending radially therein for receiving said retaining ring (84) of one of said bores (82) for restricting sliding movement of said caster (86) relative to said bore (82), a pair of upper drawers (80, 180) having a generally cuboid shape each being slideably disposed along said upper surface (72) of one of said shelves (66, 166) and between said panels (22), a lower drawer (80, 180) having a generally cuboid shape slideably disposed along said upward face (52) of said base (50), each of said drawers (80, 180) including a lower wall (100) and a pair of sidewalls (102) extending perpendicularly from said lower wall (100) and a forward wall (104) and a back wall (106) extending perpendicularly from said lower wall (100) and between said sidewalls (102), each of said sidewalls (102) including a foundation portion engaging said lower wall (100) and a terminal portion (108) spaced from said foundation portion, said terminal portion (108) of each of said sidewalls (102) divided into an inward segment (110) and an outward segment (112) extending in spaced and parallel relationship with one another to define a pocket (114) therebetween for receiving a hanging hook, said forward wall (104) and back wall (106) of each of said drawers (80, 180) including a low border engaging said lower wall (100) and an upper border (116) extending in spaced and parallel relationship with said low border, said forward wall (104) of each of said drawers (80, 180) presenting a front handle (121), said front handle (121) including a front slot (118) having a generally oval shape defined by said forward wall (104) adjacent to said upper border (116), and characterized by, a plurality of ribs (122) extending from said interior face (36) of said beams (32) and spaced along said beams (32) from one another transversely to said beams (32), a pair of ears (124, 224) extending from said shelf (66, 166) each adjacent to one of said plugs (76) with each ear (124, 224) engaging both of said ribs (122) of the adjacent pairs of ribs (122) on said beams (32) to resist external forces and maintain said panels (22) in spaced and parallel relationship with one another and perpendicular to said shelf (66, 166), each of said mounting sides (67, 167) including a plate (128, 228) having a rectangular shape overlying each of said mounting sides (67, 167), a pair of said ears (124, 224) extending from each of said plates (128, 228) in spaced and parallel relationship with one another for engaging an adjacent pair of said ribs (122) of said beams (32) to maintain said panels (22) parallel to one another and perpendicular to said panels (22), a pair of webs (130) each having a generally triangular shape extending between said plate (128, 228) and one of said ears (124, 224) in coplanar relationship with one of said shelves (66, 166) for providing for increased rigidity of said ears (124, 224), each of said plates (128) and said ears (124) of said shelf (66) defining an uppermost periphery (142) extending upwardly from said upper surface (72) of said shelf (66).

17. The apparatus as set forth in claim 16 wherein said forward wall (104) of each of said drawers (80) further defines a front groove (132) extending at an angle from said upper border (116) for providing for a surface for a user to rest their thumb while grasping said front handle (121), said front handle (121) further including a front indentation (123) defined by said forward wall adjacent to said upper border (116), said back wall (106) of each of said drawers (80, 180) presenting a rearward handle (136), said rearward handle (136) including a back slot (134) having a generally oval shape defined by said back wall (106), said rearward handle (136) further including a rear indentation (125) defined by said back wall (106), said back wall (106) further defines a back groove (138) extending at an angle from said upper border (116) of said back wall (106) for providing for a surface for a user to rest their thumb while grasping said rearward handle (136), a pair of ramps (140) being linearly spaced from one another and having a generally triangular shape extend away from said outward surface of said sidewalls (102) of each of said drawers (80) for being flexibly wedged against said beams (32) of said panels (22) for inhibiting sliding movement of said drawer (80) relative to said panels (22), each of said drawers (80) are of a polypropylene material.

18. The apparatus as set forth in claim 16 and comprising a pair of stoppers (144) having a generally triangular shape extending upwardly from said upper surface (72) of each of said shelves (166) adjacent to said rear edge (70) of each of said shelves (166) and a pair of stoppers (144) having a generally triangular shape extending downwardly from said lower surface (73) of each of said shelves (166) adjacent to said rear edge (70) of each of said shelves (166) for blocking said drawers (180) to prevent said drawers (180) from sliding past said stopper (144), said drawers (180) being of a fabric material.

\* \* \* \* \*